(12) United States Patent
Lim et al.

(10) Patent No.: US 10,293,812 B2
(45) Date of Patent: May 21, 2019

(54) METHOD FOR CONTROLLING HYBRID VEHICLE

(71) Applicants:HYUNDAI MOTOR COMPANY, Seoul (KR); KIA Motors Corporation, Seoul (KR)

(72) Inventors: Jae Sang Lim, Suwon-si (KR); Young Un Kim, Suwon-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 23 days.

(21) Appl. No.: 15/819,205

(22) Filed: Nov. 21, 2017

(65) Prior Publication Data

US 2019/0118797 A1    Apr. 25, 2019

(30) Foreign Application Priority Data

Oct. 20, 2017   (KR) .......................... 10-2017-0136419

(51) Int. Cl.
  *B60W 20/40* (2016.01)
  *B60W 40/12* (2012.01)
  *B60L 15/20* (2006.01)
  *B60L 11/18* (2006.01)

(52) U.S. Cl.
  CPC .......... *B60W 20/40* (2013.01); *B60L 11/1851* (2013.01); *B60L 15/20* (2013.01); *B60W 40/12* (2013.01); *B60L 2240/427* (2013.01); *B60W 2510/0638* (2013.01); *B60W 2510/08* (2013.01); *B60W 2710/08* (2013.01); *Y10S 903/93* (2013.01)

(58) Field of Classification Search
  CPC ................ B60W 20/40; B60W 40/12; B60W 2510/0638; B60W 2510/08; B60W 2710/08; B60L 11/1851; B60L 15/20; B60L 2240/427; Y10S 903/93
  USPC ............... 701/22; 180/65.285, 65.28, 65.265
  See application file for complete search history.

(56) References Cited

U.S. PATENT DOCUMENTS

| 2014/0077941 | A1* | 3/2014 | Yamamura | ............. B60K 35/00 340/438 |
| 2016/0230850 | A1* | 8/2016 | Kanada | .................. B60K 6/365 |
| 2016/0368388 | A1  | 12/2016 | Kim et al. | |
| 2017/0129478 | A1* | 5/2017 | Minegishi | ............. B60W 20/50 |

FOREIGN PATENT DOCUMENTS

| JP | 2000-186608 | 7/2000 |
| JP | 2001-057710 | 2/2001 |
| KR | 10-1684538  | 12/2016 |

\* cited by examiner

*Primary Examiner* — Marthe Y Marc-Coleman
(74) *Attorney, Agent, or Firm* — McDonnell Boehnen Hulbert & Berghoff LLP (57) ABSTRACT

A method for controlling a hybrid vehicle includes: determining, by a controller, an operation mode of the hybrid vehicle based on operation state information of the hybrid vehicle; and controlling, by the controller, a first drive motor included in the hybrid vehicle based on angle information of a second drive motor of the hybrid vehicle provided by an angle sensor of the second drive motor when the operation mode of the hybrid vehicle is a hybrid electric vehicle mode. The hybrid electric vehicle mode is an operation mode in which an engine of the hybrid vehicle, the first drive motor, and the second drive motor drive the hybrid vehicle.

12 Claims, 11 Drawing Sheets

| Vd_diff | α |
|---|---|
| Vd_diff ≤ K1 | 0 |
| K1 < Vd_diff ≤ K2 | 1 |
| K2 < Vd_diff ≤ K3 | 2 |
| K3 < Vd_diff ≤ K4 | 3 |
| K4 < Vd_diff ≤ K5 | 4 |
| K5 < Vd_diff | 5 |

METHOD FOR CONTROLLING HYBRID VEHICLE

CROSS-REFERENCE TO RELATED APPLICATION

This application claims priority to and the benefit of Korean Patent Application No. 10-2017-0136419 filed in the Korean Intellectual Property Office on Oct. 20, 2017, the entire contents of which are incorporated herein by reference.

BACKGROUND OF THE DISCLOSURE

(a) Field of the Disclosure

The present disclosure relates to an environmentally-friendly vehicle, and more particularly, to a method for controlling a hybrid vehicle (or a hybrid electric vehicle).

(b) Description of the Related Art

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can consist of an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can consist of a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

A motor control unit (MCU) is used to control an induction motor or a synchronous motor that is used in the hybrid vehicle. For this, a coordinate system is established according to a position of flux. Accordingly, a resolver is used to read an absolute position of a motor rotator. The resolver senses speed and phase data of the motor, transfers the position data of the motor rotator to the MCU, and these are used for generating a torque order and a speed order.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method for controlling a hybrid vehicle which is capable of removing one of the angle sensors included in two drive motors in the hybrid vehicle.

An exemplary embodiment of the present disclosure may provide the method for controlling the hybrid vehicle, including: determining, by a controller, an operation mode of the hybrid vehicle based on operation state information of the hybrid vehicle; and controlling, by the controller, a first drive motor included in the hybrid vehicle based on angle information of a second drive motor of the hybrid vehicle provided by an angle sensor of the second drive motor when the operation mode of the hybrid vehicle is a hybrid electric vehicle mode. The hybrid electric vehicle mode may be an operation mode in which an engine of the hybrid vehicle, the first drive motor, and the second drive motor drive the hybrid vehicle.

Controlling the first drive motor may include: setting, by the controller, an initial angle of the first drive motor; calculating, by the controller, an angle of the first drive motor based on the initial angle of the first drive motor and the angle information of the second drive motor; and controlling, by the controller, the first drive motor based on the angle of the first drive motor.

Setting the initial angle of the first drive motor may include: calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage; calculating, by the controller, an average value of the sixth harmonic and an average value of the reference sixth harmonic; calculating, by the controller, an average difference value between the average value of the sixth harmonic and the average value of the reference sixth harmonic; selecting, by the controller, an angle correction value based on a table according to the average difference value; and calculating, by the controller, the initial angle of the first drive motor based on the minimum value of the angle difference value and the angle correction value. The reference sixth harmonic may be a harmonic generated when the initial angle of the first drive motor does not need to be corrected.

The method for controlling the hybrid vehicle may further include: controlling, by the controller, the second drive motor based on the angle information of the second drive motor when the operation mode of the hybrid vehicle is an electric vehicle mode. The electric vehicle mode may be an operation mode in which the second drive motor drives the hybrid vehicle.

The method for controlling the hybrid vehicle may further include: controlling, by the controller, the first drive motor based on engine speed information provided by an engine speed sensor of the engine when the operation mode of the hybrid vehicle is an engine start mode. The engine start mode may be an operation mode in which the first drive motor starts the engine.

Controlling the first drive motor may include: setting, by the controller, an initial angle of the first drive motor; calculating, by the controller, an angle of the first drive motor based on angle information of the engine calculated based on the initial angle of the first drive motor and the engine speed information; and controlling, by the controller, the first drive motor based on the angle of the first drive motor.

Setting the initial angle of the first drive motor may include: calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage; calculating, by the controller, an average value of the sixth harmonic and an average value of the reference sixth harmonic; calculating, by the controller, an average difference value between the average value of the sixth harmonic and the average value of the reference sixth harmonic; selecting, by the controller, an angle correction value based on a table according to the average difference value; and calculating, by the controller, the initial angle of the first drive motor based on the minimum value of the angle difference value and the angle correction value. The reference sixth harmonic may be a harmonic generated when the initial angle of the first drive motor does not need to be corrected.

The method for controlling the hybrid vehicle may further include: controlling, by the controller, the first drive motor based on engine speed information provided by an engine speed sensor of the engine when the operation mode of the hybrid vehicle is a battery charge mode. The battery charge mode may be an operation mode in which the first drive motor charges a battery of the hybrid vehicle.

Controlling the first drive motor may include: setting, by the controller, an initial angle of the first drive motor; calculating, by the controller, an angle of the first drive motor based on angle information of the engine calculated based on the initial angle of the first drive motor and the engine speed information; and controlling, by the controller, the first drive motor based on the angle of the first drive motor.

Setting the initial angle of the first drive motor may include: calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage; calculating, by the controller, an average value of the sixth harmonic and an average value of the reference sixth harmonic; calculating, by the controller, an average difference value between the average value of the sixth harmonic and the average value of the reference sixth harmonic; selecting, by the controller, an angle correction value based on a table according to the average difference value; and calculating, by the controller, the initial angle of the first drive motor based on the minimum value of the angle difference value and the angle correction value. The reference sixth harmonic may be a harmonic generated when the initial angle of the first drive motor does not need to be corrected.

A clutch connecting the first drive motor with the second drive motor or disconnecting the first drive motor from the second drive motor may be disposed between the first drive motor and the second drive motor.

A planetary gear set transmitting power of the first drive motor, power of the engine, and power of the second drive motor may drive the hybrid vehicle.

The method for controlling the hybrid vehicle according to the exemplary embodiment of the present disclosure may control the hybrid vehicle by removing one of the angle sensors included in the drive motors in the hybrid vehicle. Therefore, the manufacturing cost of the hybrid vehicle may be reduced.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

When two drive motors are used in a hybrid electric vehicle (HEV) system or a plug-in hybrid electric vehicle (PHEV) system with an engine clutch disposed between the drive motors or two drive motors are used in the HEV system or the PHEV system with a planetary gear set (or a planetary gear combination) disposed between the drive motors, a situation may occur in which the engine clutch or the planetary gear set is mechanically connected according to an operation mode of the vehicle. In this case, a control of the vehicle may be performed by estimating an angle of a rotor of the drive motor by using respective angle sensors included in the drive motors.

Figure 1:
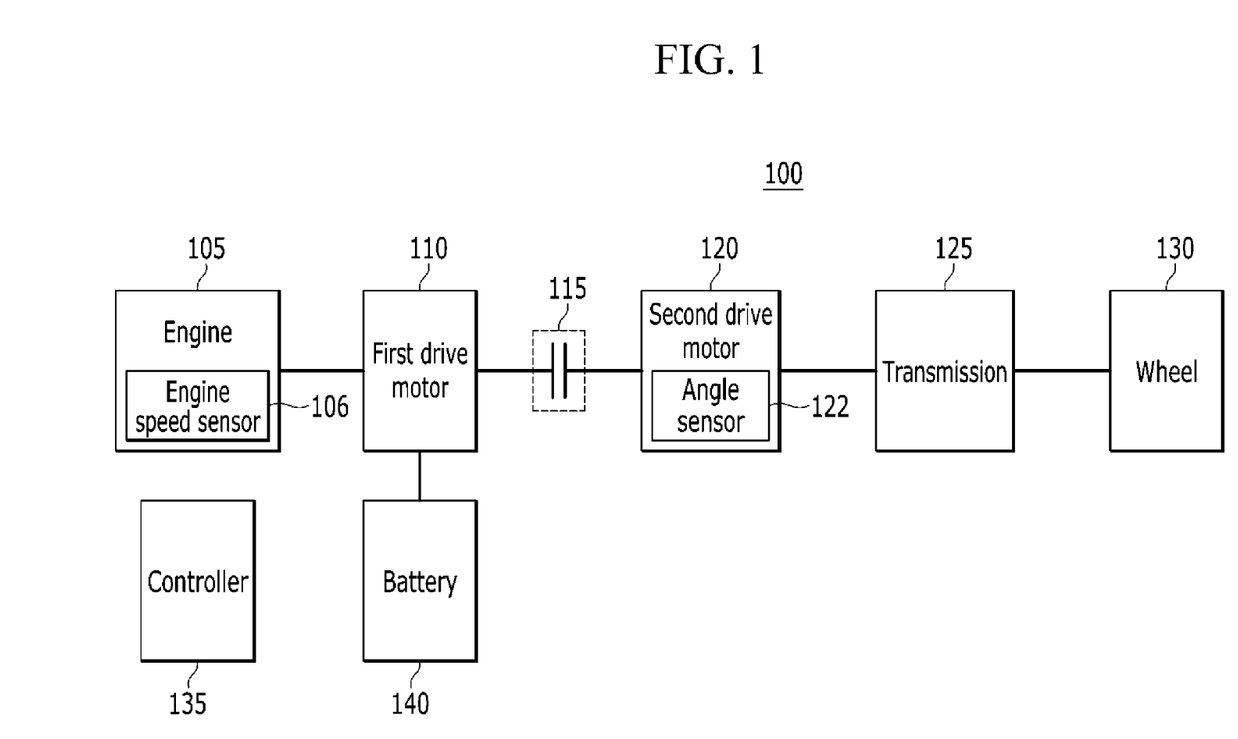
FIG. 1 is a view for explaining a hybrid vehicle to which a method for controlling the hybrid vehicle according to an exemplary embodiment of the present disclosure is applied.
Figure 2:
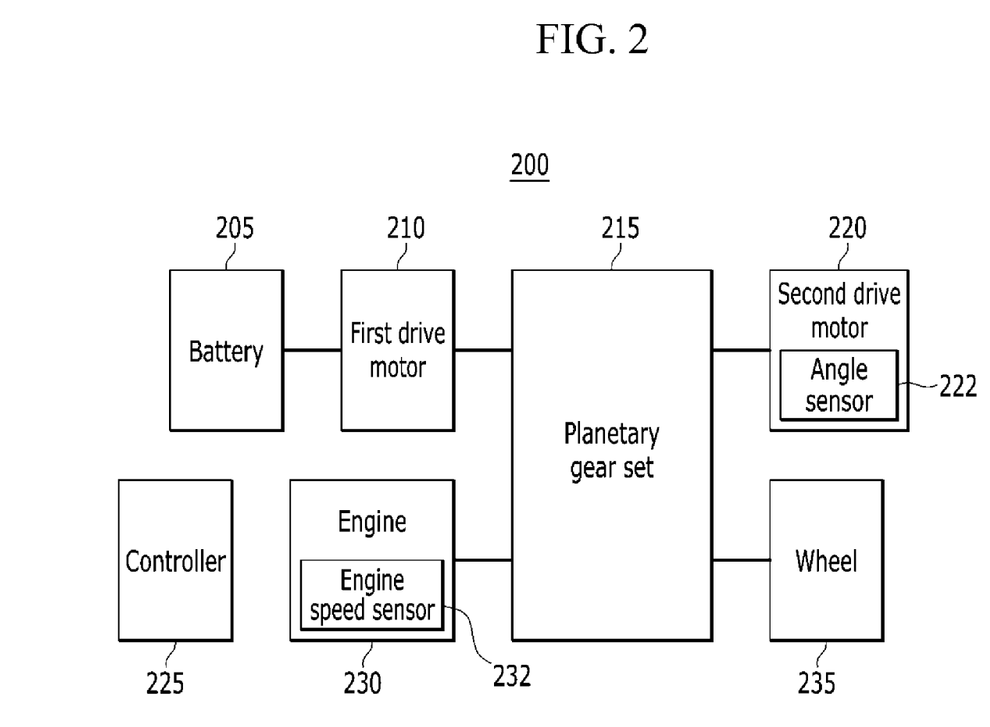
FIG. 2 is a view for explaining another example of the hybrid vehicle to which the method for controlling the hybrid vehicle according to the exemplary embodiment of the present disclosure is applied.
Figure 3:
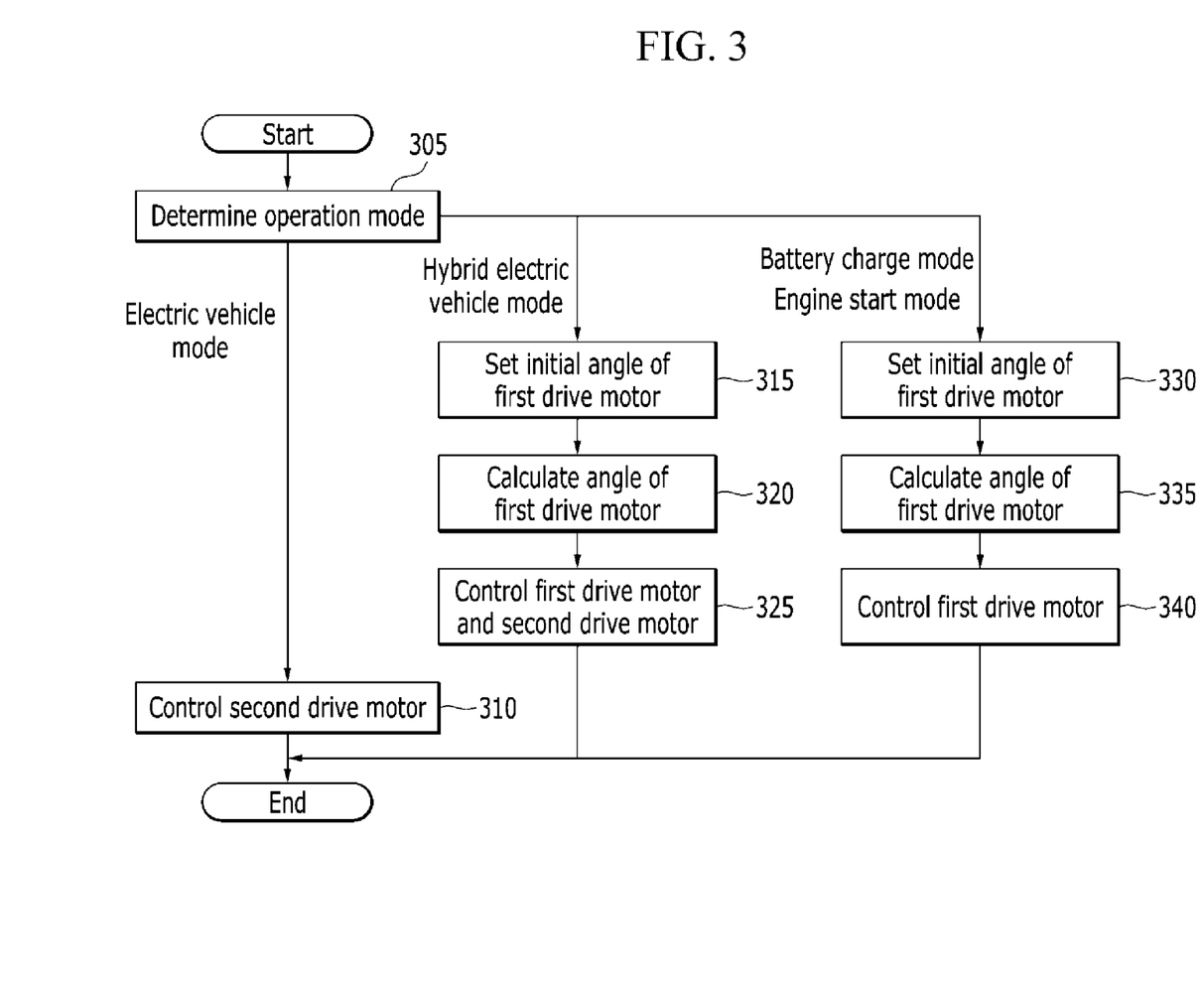
FIG. 3 is a flowchart illustrating the method for controlling the hybrid vehicle according to the exemplary embodiment of the present disclosure.
Figure 4:
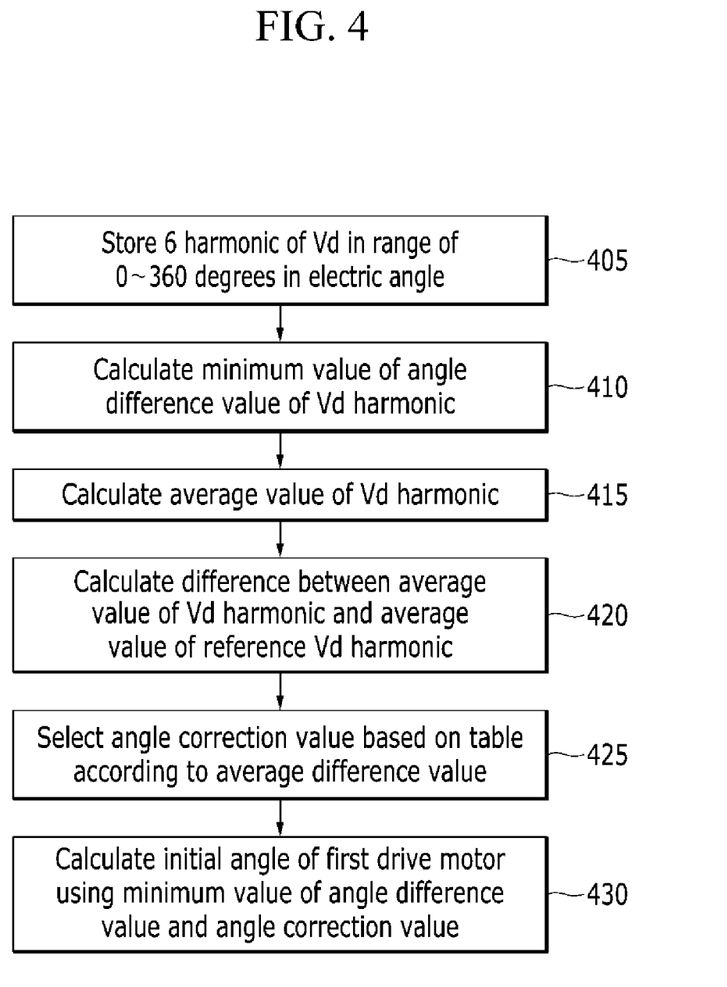
FIG. 4 is a flowchart illustrating an initial angle setting step of a first drive motor shown in FIG. 3.
Figure 5:
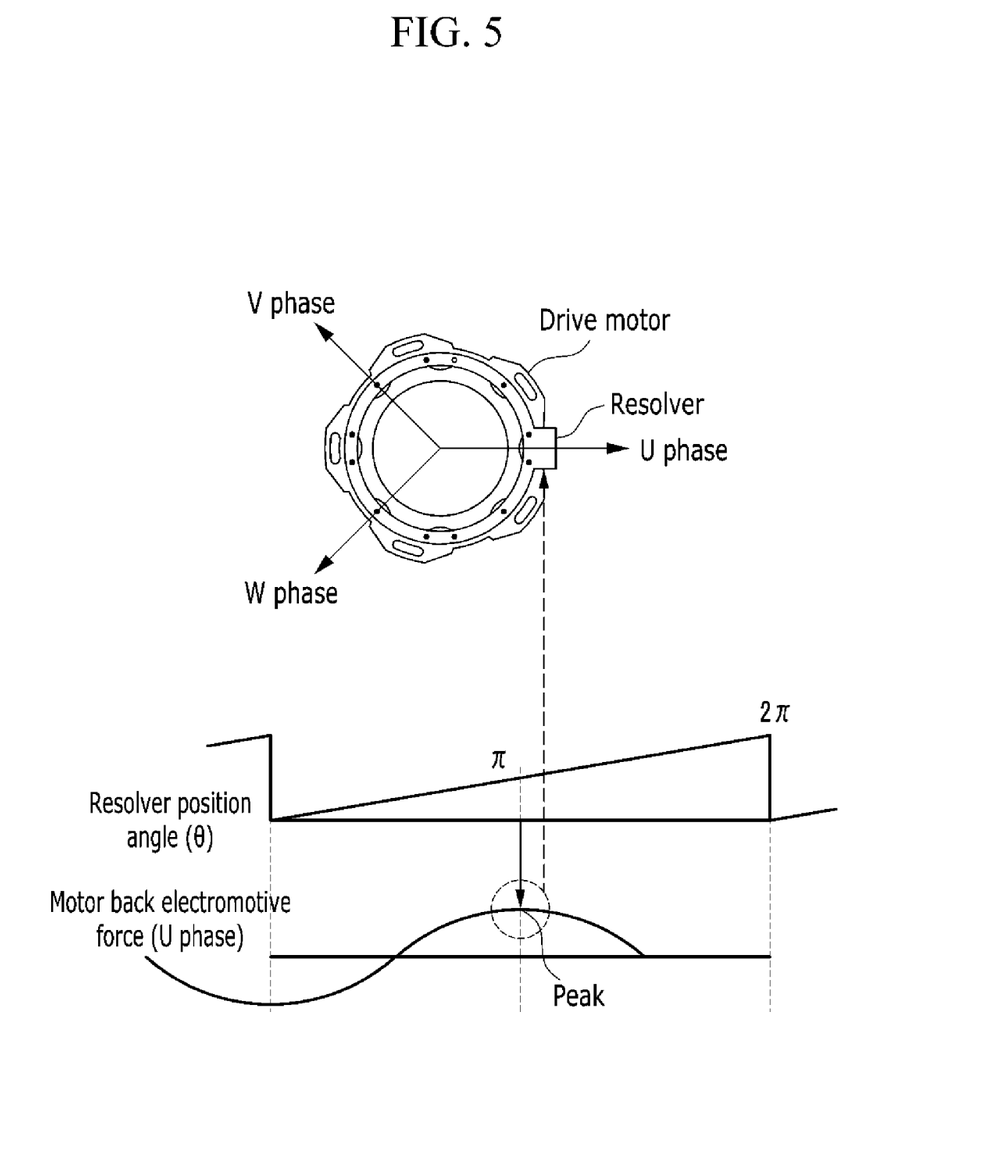
FIG. 5 and FIG. 6 are views for explaining control steps of a second drive motor shown in FIG. 3.
Figure 6:
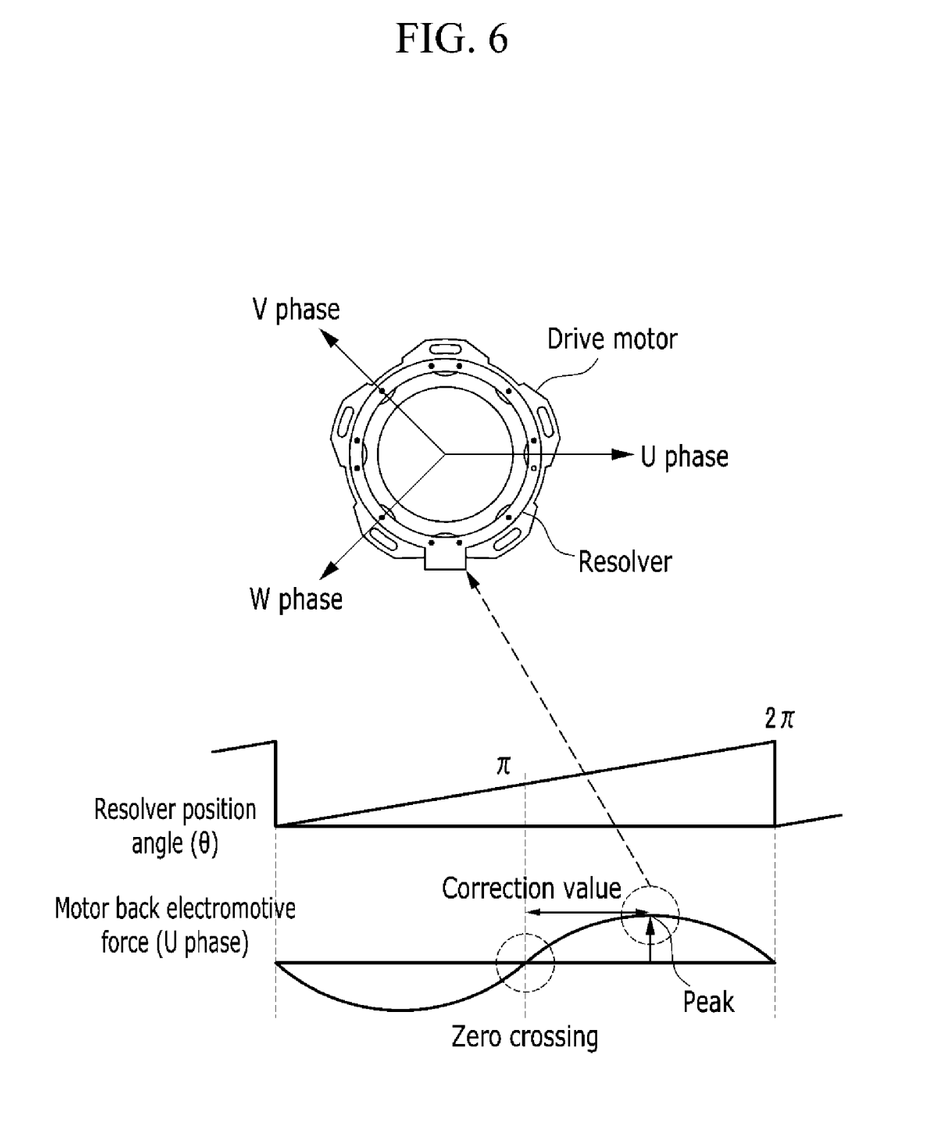
Figure 7:
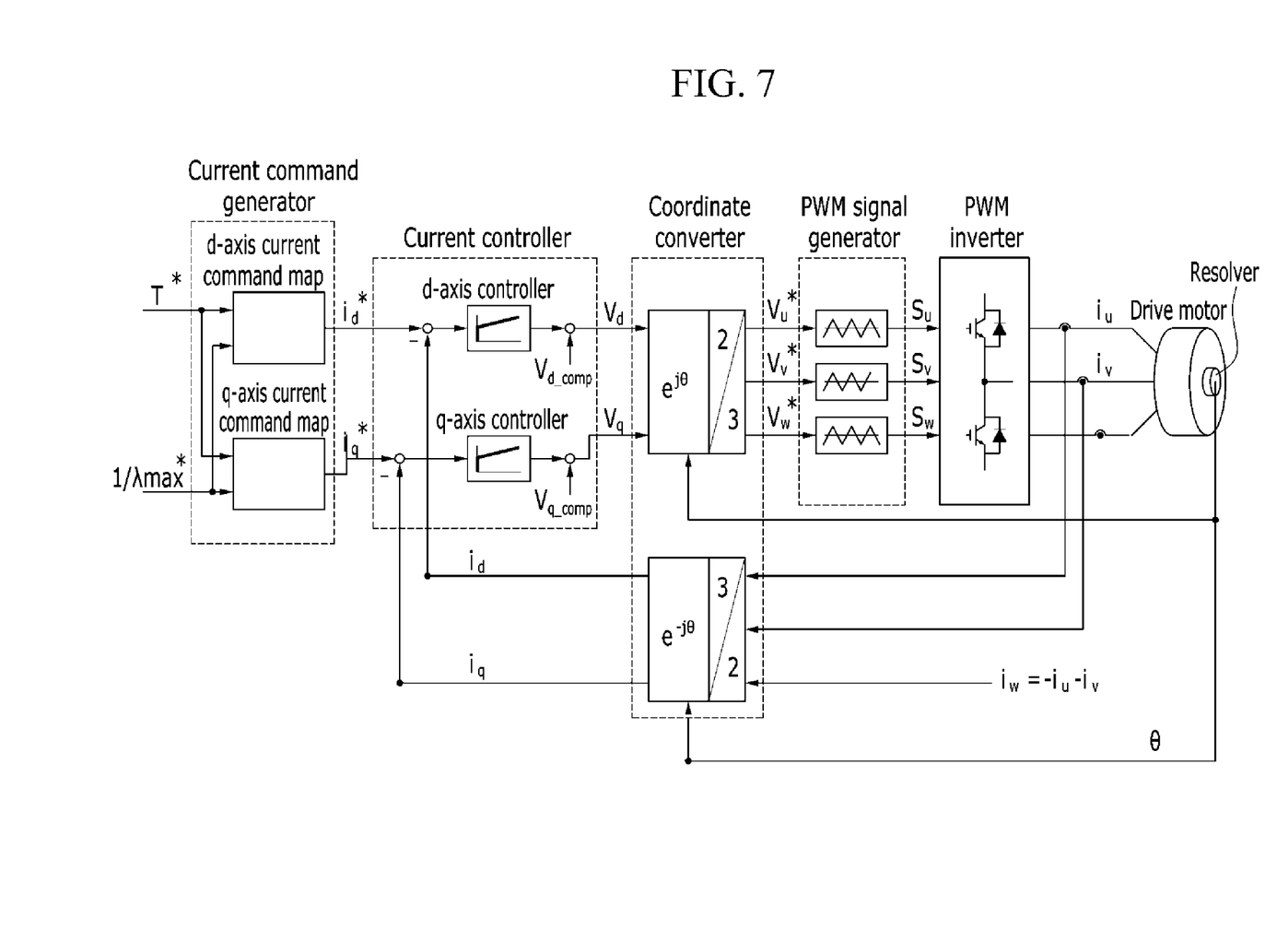
FIG. 7 is a view for explaining an initial angle setting step of the first drive motor shown in FIG. 3.
Figure 8:
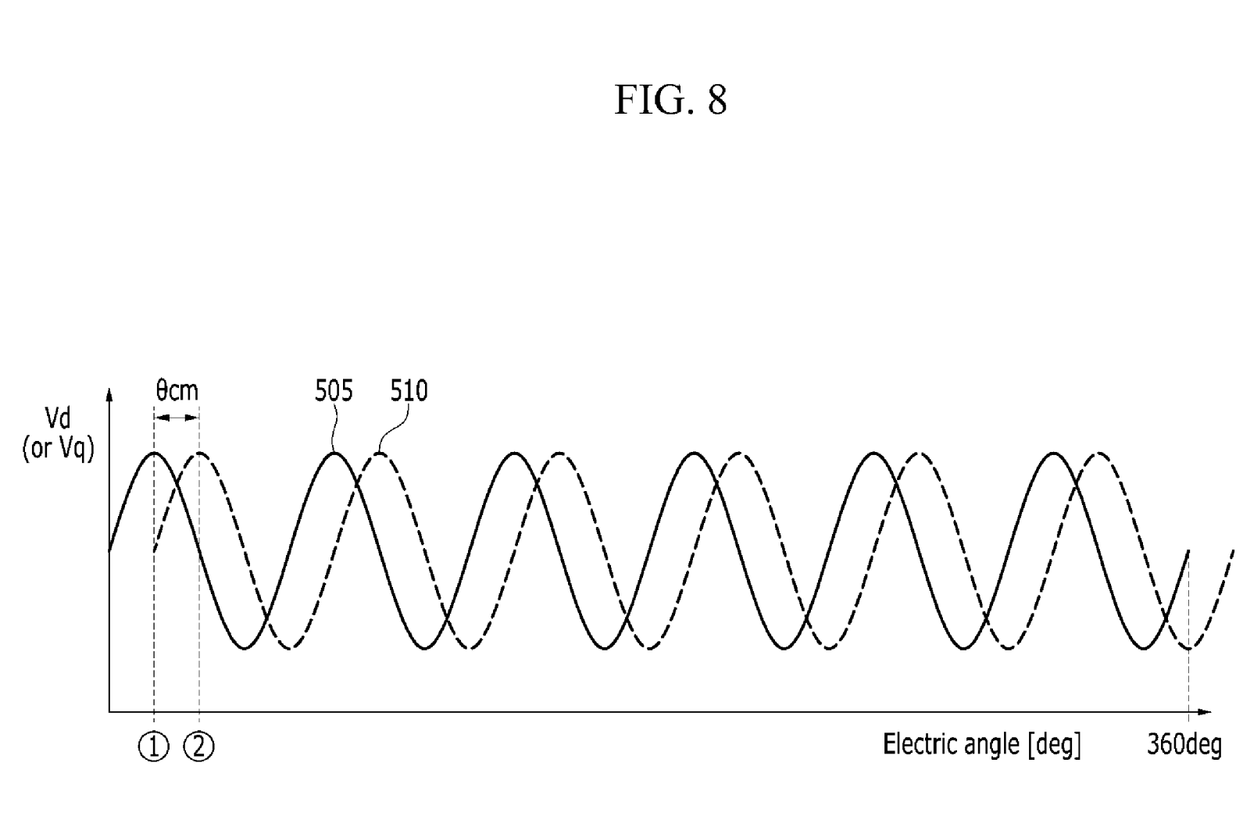
FIG. 8 to FIG. 10 are graphs for explaining the initial angle setting step of the first drive motor shown in FIG. 3.
Figure 9:
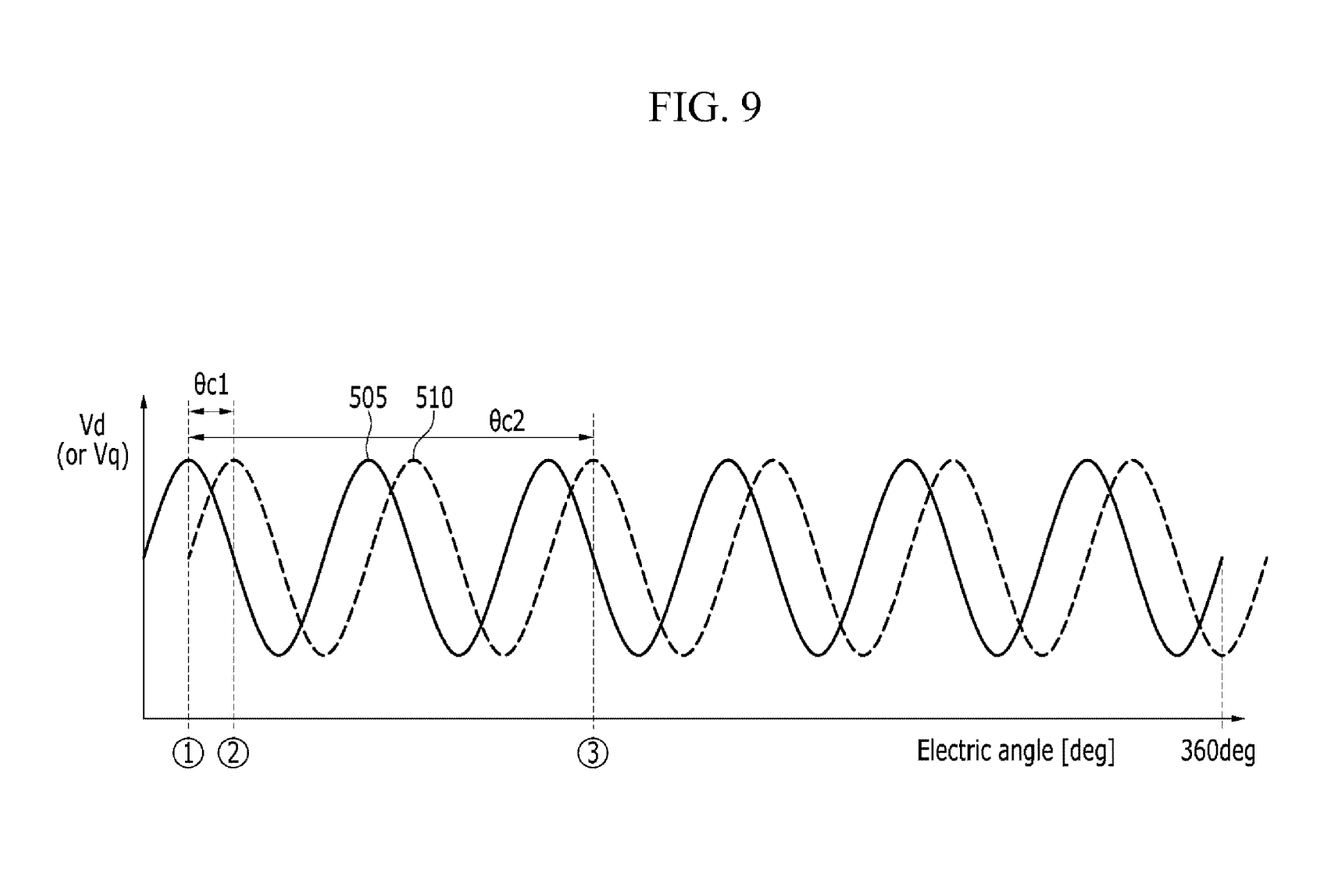
Figure 10:
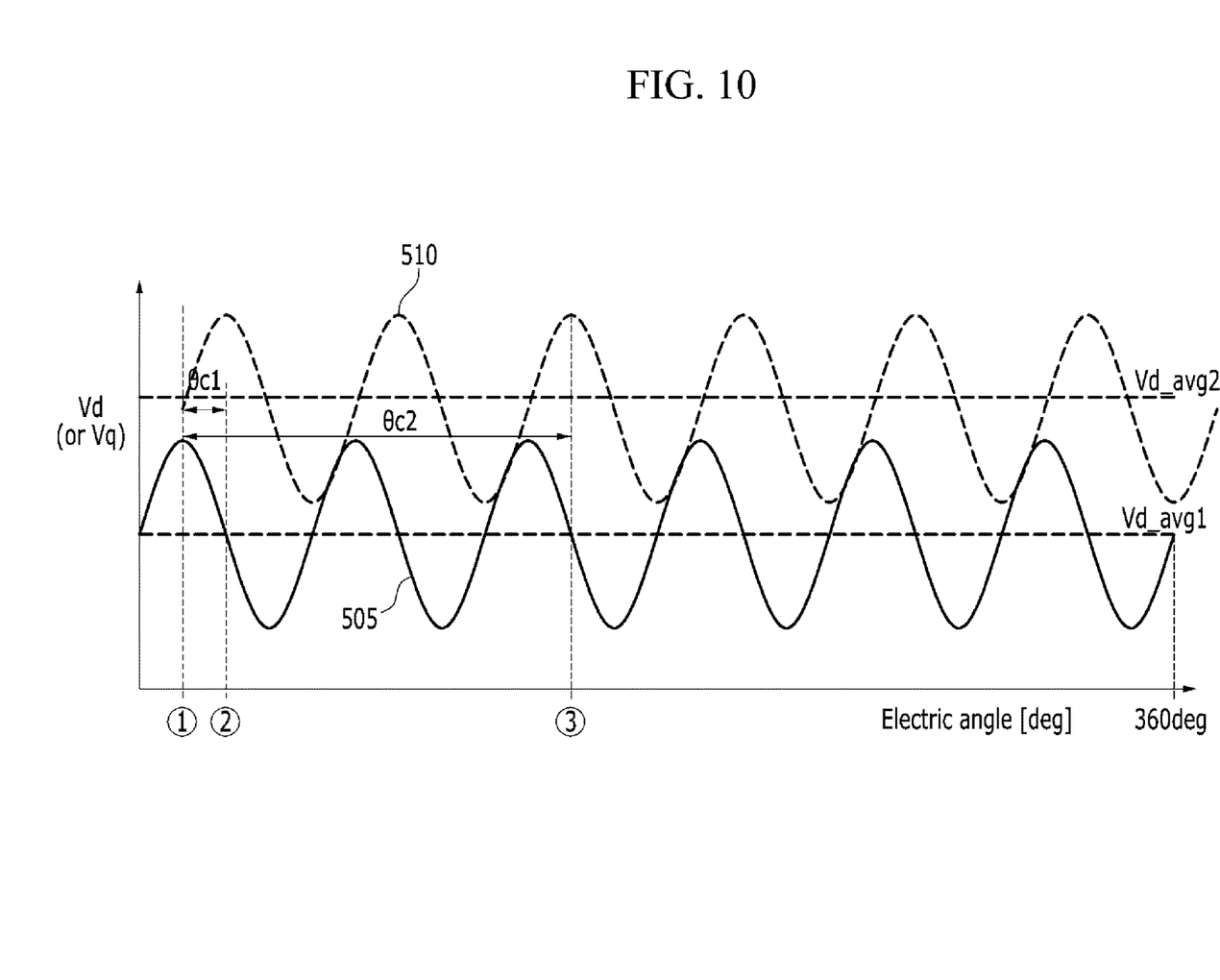
Figure 11:
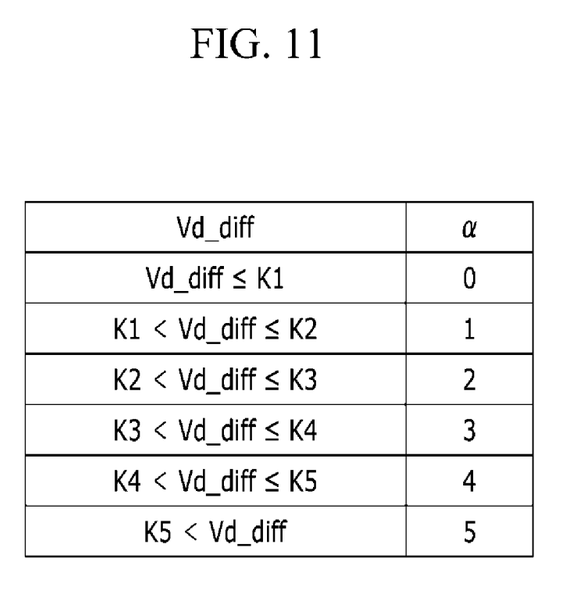
FIG. 11 is a table for explaining the initial angle setting step of the first drive motor shown in FIG. 3.

FIG. 1 is a view for explaining a hybrid vehicle to which a method for controlling the hybrid vehicle according to an exemplary embodiment of the present disclosure is applied. FIG. 2 is a view for explaining another example of the hybrid vehicle to which the method for controlling the hybrid vehicle according to the exemplary embodiment of the present disclosure is applied. FIG. 3 is a flowchart illustrating the method for controlling the hybrid vehicle according to the exemplary embodiment of the present disclosure. FIG. 4 is a flowchart illustrating an initial angle setting step of a first drive motor shown in FIG. 3. FIG. 5 and FIG. 6 are views for explaining control steps of a second drive motor shown in FIG. 3. FIG. 7 is a view for explaining an initial angle setting step of the first drive motor shown in FIG. 3. FIG. 8 to FIG. 10 are graphs for explaining the initial angle setting step of the first drive motor shown in FIG. 3. FIG. 11 is a table for explaining the initial angle setting step of the first drive motor shown in FIG. 3.

Referring to FIGS. 1 to 4, in a determination step 305, a controller 135 or 225 may determine an operation mode of the hybrid vehicle 100 or 200 based on operation state information of the hybrid vehicle.

The hybrid vehicle 100 may include an engine 105, a first drive motor 110, a clutch (or an engine clutch) 115, a second drive motor 120, a transmission 125, wheels (or driving wheels) 130, the controller 135, and a battery 140. The hybrid vehicle 100 may be referred to as a transmission mounted electric device (TMED) system.

The clutch 115 may be disposed between the first drive motor 110 and the second drive motor 120 and may connect the first drive motor with the second drive motor or disconnect the first drive motor from the second drive motor.

The battery 140 may include a plurality of unit cells. A high voltage for providing a driving voltage (for example, 350-450 V DC) to the first drive motor 110 or the second drive motor 120 that provides driving power to the wheels 130 may be stored in the battery.

For example, the controller 135 may be one or more microprocessors operated by a program or hardware including the microprocessor. The program may include a series of commands for executing the method for controlling the hybrid vehicle according to the exemplary embodiment of the present disclosure. The commands may be stored in a memory. The controller 135 may control the overall operation of the hybrid vehicle 100.

The controller 135 may include a hybrid control unit (HCU), an engine control unit (ECU) for controlling an operation of the engine 105, and a motor control unit (MCU) for controlling operations of the first drive motor 110 and the second drive motor 130 and including an inverter configured as a plurality of power switching elements. The HCU may be the highest controller, may synthetically control the ECU and the MCU connected to a network such as a controller area network (CAN), which is a vehicle network, and may control overall operation of the hybrid vehicle 100.

The engine 105 may include an engine speed sensor 106 such as a hall sensor. The first drive motor 110 may not include an angle sensor and the second drive motor 120 may include an angle sensor 122 such as a resolver. The angle sensor 122 may be a sensor for detecting a position of a rotor in the motor 110 and may transmit rotation position information of the motor to the controller 135. The controller 135 may control current and voltage to be supplied to the motor based on the information.

The first drive motor 110 may be, for example, an interior permanent magnet (IPM) motor.

The second drive motor 120 may be, for example, an IPM motor. The second drive motor 120 may be operated by a three-phase AC voltage that is output from the MCU to generate a torque. The motor 120 may be operated as a generator during coasting drive or regenerative braking to supply a voltage (or regenerative energy) to the battery 140.

The hybrid vehicle 200 may include a battery 205, a first drive motor 210, a planetary gear set (or a planetary gear device) 215, a second drive motor 220, the controller 225, an engine 230, and wheels 235.

The planetary gear set 215 may transmit power (or torque) of the first drive motor 210, power of the engine 230, and power of the second drive motor 220 to drive the vehicle 200. A function of the planetary gear set 215 may be similar to that of the clutch 110 and transmission 125 of FIG. 1.

The battery 205 may include a plurality of unit cells. A high voltage for providing a driving voltage (for example, 350-450 V DC) to the first drive motor 210 or the second drive motor 220 that provides driving power to the wheels 235 may be stored in the battery.

For example, the controller 225 may be one or more microprocessors operated by a program or hardware including the microprocessor. The program may include a series of commands for executing the method for controlling the hybrid vehicle according to the exemplary embodiment of the present invention. The commands may be stored in a memory. The controller 225 may control overall operation of the hybrid vehicle 200.

The controller 225 may include a hybrid control unit (HCU), an engine control unit (ECU) for controlling an operation of the engine 230, and a motor control unit (MCU) for controlling operations of the first drive motor 210 and the second drive motor 220 and including an inverter configured as a plurality of power switching elements. The HCU may be the highest controller, may synthetically control the ECU and the MCU connected to a network such as a controller area network (CAN), which is a vehicle network, and may control overall operation of the hybrid vehicle 200.

The first drive motor 210 may not include an angle sensor and the second drive motor 220 may include an angle sensor 222 such as a resolver. The angle sensor 222 may be a sensor for detecting a position of a rotor in the motor 210 and may transmit rotation position information of the motor to the controller 225. The controller 225 may control current and voltage to be supplied to the motor based on the information. The engine 230 may include an engine speed sensor 232 such as a hall sensor.

The first drive motor 210 may be, for example, an interior permanent magnet (IPM) motor.

The second drive motor 220 may be, for example, an IPM motor. The second drive motor 220 may be operated by a three-phase AC voltage that is output from the MCU to generate a torque. The motor 220 may be operated as a generator during coasting drive or regenerative braking to supply a voltage (or regenerative energy) to the battery 205.

For example, the operation state information may include a demand torque of a driver of the vehicle detected by an acceleration pedal position sensor included in the hybrid vehicle 100 or 200 or state of charge (SOC) information of the battery 140 or 205 detected by a battery sensor of the hybrid vehicle.

When it is determined in the determination step 305 that the hybrid vehicle is in an electric vehicle (EV) mode, the method for controlling the hybrid vehicle which is a process may proceed to a control step 310.

The EV mode may be an operation mode in which the second drive motor 120 or 220 drives the hybrid vehicle. In the EV mode, the clutch 115 may be disconnected (or disengaged) and a torque (e.g., a low output) of the second drive motor 120 or 220 may be transmitted to the wheels 130 or 235 via the transmission 125 or the planetary gear set 215.

When it is determined in the determination step 305 that the hybrid vehicle is in a hybrid electric vehicle (HEV) mode, the process may proceed to a setting step 315.

The HEV mode may be an operation mode in which the engine 105 or 230 of the hybrid vehicle, the first drive motor 110 or 210, and the second drive motor 120 or 220 drive the hybrid vehicle. In the HEV mode, the clutch 115 may be connected (or engaged) and a torque (or e.g., a high output) of the engine, the first drive motor, and the second drive motor may be delivered to the wheels 130 or 235 via the transmission 125 or the planetary gear set 215.

When the hybrid vehicle is determined to be in an engine start mode or a battery charge mode in the determination step 305, the process may proceed to a setting step 330.

The engine start mode may be an operation mode in which the first drive motor 110 or 210 starts the engine 105 or 230 of the hybrid vehicle. In the engine start mode, the clutch 115 may be disengaged and a torque of the engine 105 or 230 may not be transmitted to the wheels 130 or 235 through the transmission 125 or the planetary gear set 215.

The battery charge mode may be an operation mode in which the first drive motor 110 or 210 charges the battery 140 or 205 of the hybrid vehicle. In the battery charge mode, the engine 105 or 230 mechanically coupled to the first drive motor 110 or 210 may charge the battery by controlling the motor such that the first drive motor generates a regeneration torque. In the battery charge mode, the clutch 115 may be disengaged and a torque of the engine 105 or 230 may not be transmitted to the wheels 130 or 235 through the transmission 125 or the planetary gear set 215.

According to a control step 310, when the operation mode of the hybrid vehicle is the EV mode, the controller 135 or 225 may control the second drive motor 120 or 220 based on angle information (or rotation angle information) of the second drive motor.

A method of controlling an operation of the second drive motor 120 or 220 will be described with reference to FIGS. 5 and 6.

FIG. 5 is a diagram for explaining a case (or a state) in which an initial angle correction of the resolver included in the second drive motor 120 or 220 is not necessary. A position angle (π) of the resolver position angle (θ) should equal to an position (or an angle) at which a peak value of a back electromotive force of the motor (or the motor stator) in a U-phase (U-phase coil) is generated as shown in FIG. 5 in order to perform vector control of the motor.

FIG. 6 is a diagram for explaining a case (or a state) in which an initial angle correction of the resolver included in the second drive motor 120 or 220 is required. When there is a difference between the position angle (π) of the resolver position angle (θ) and the position at which the peak value of the back electromotive force of the motor is generated as shown in FIG. 6, the controller 135 or 225 may use software for correcting the initial angle of the resolver to correct the difference.

According to the setting step 315, when the operation mode of the hybrid vehicle is the HEV mode, the controller 135 or 225 may set an initial angle of the first drive motor 110 or 210.

A method of setting the initial angle of the first drive motor 110 or 210 will be described with reference to FIG. 4.

According to a storing step 405, the controller 135 or 225 may calculate a D-axis voltage $V_d$ or a Q-axis voltage $V_q$ that is included in a section where an electric angle of the first drive motor 110 or 210 is greater than 0 degree and less than 360 degrees and controls (or operates) the first drive motor, and may store the calculated voltage in a memory.

Referring to FIG. 7, the D-axis voltage $V_d$ or the Q-axis voltage $V_q$ for controlling the first drive motor 110 or 210 will be described below.

FIG. 7 shows an exemplary embodiment of the controller 135 or 225 for controlling the first drive motor 110 or 210 or the second drive motor 120 or 220. The exemplary embodiment may be a controller for controlling the IPM motor. When the motor shown in FIG. 7 is the first drive motor 110 or 210, the resolver may be omitted in FIG. 7.

The exemplary embodiment of the controller may include a current command generator, a current controller, a coordinate converter, a pulse width modulation (PWM) signal generator, and a PWM inverter.

The current command generator may generate a current command $i_d^*$ of the d-axis and a current command $i_q^*$ of the q-axis according to an input torque command (or an input torque of the drive motor) T* and a speed 1/λmax* of the drive motor calculated based on an angle θ of the motor detected by the resolver of the drive motor, and may provide the generated current commands to the current controller. The current command generator may include a torque command and a current command map per a torque command and a motor speed, and may extract current commands $i_d^*$ and $i_q^*$ of the d and q axes, respectively, corresponding to the torque command T* and the motor speed 1/λmax* from the current command map.

The current controller may generate d and q axes voltage commands $V_d$ and $V_q$ for operating the motor, depending on d and q axes current commands $i_d^*$ and $i_q^*$. The current controller may receive a d-axis feedback current $i_d$ applied to d-axis, and a q-axis feedback current $i_q$ applied to q-axis from the coordinate converter, and may remove a torque error by calibrating d and q axes voltage commands $V_d$ and $V_q$.

The coordinate converter may obtain 3-phase voltage commands $V_u^*$, $V_v^*$, and $V_w^*$ by 3-phase converting d and q axes voltage commands $V_d$ and $V_q$. The PWM signal generator may generate PWM switching signals $S_u$, $S_v$, and $S_w$ using the 3-phase voltage commands $V_u^*$, $V_v^*$, and $V_w^*$ and may output the PWM switching signals $S_u$, $S_v$, and $S_w$ to the PWM inverter.

The PWM inverter may include a plurality of switching elements selectively turned on and off by the inputted PWM switching signals $S_a$, $S_b$, and $S_e$, and may output 3-phase currents $I_u$, $I_v$, and $I_w$ for controlling the motor.

The coordinate converter may calculate the d-axis feedback current $i_d$ and the q-axis feedback current $i_q$ from the 3-phase currents $I_u$, $I_v$, and $I_w$ and may feed the d-axis feedback current $i_d$ and the q-axis feedback current $i_q$ back to the current controller.

An example of the controller including the current controller may be disclosed in Korean Patent No. 10-1684538 (U.S. Application Publication No. 2016/0368388).

As shown in FIG. 7, the D-axis voltage $V_d$ or the Q-axis voltage $V_q$ for controlling the first drive motor 110 or 210 may be the d-axis voltage command of the first drive motor or the q-axis voltage command of the first drive motor that is the output of the current controller included in the controller 135 or 225. The voltage $V_d$ or $V_q$ may have a sixth harmonic output when vector control of the drive motor is performed.

According to a calculation step 410, the controller 135 or 225 may calculate a minimum value of an angle difference value between an electric angle of the first drive motor corresponding to a peak value of the sixth harmonic and an electric angle of the first drive motor corresponding to a peak value of a reference sixth harmonic of the voltage $V_d$ or $V_q$.

A method of calculating the minimum value 8 cm of the angle difference value will be described with reference to FIG. 8.

In FIG. 8, a reference numeral 505 may indicate the reference sixth harmonic of the voltage and a reference numeral 510 may indicate the sixth harmonic generated when the initial angle of the first drive motor 110 or 210 is not accurately set. The reference sixth harmonic is a harmonic generated when the initial angle of the first drive motor 110 or 210 is correctly set and may be determined by a test or software including a mathematical analysis. The reference sixth harmonic may occur when the position angle ($\pi$) of the resolver position angle ($\theta$) is equal to the position at which the peak value of the back electromotive force of the motor is generated as mentioned in the description related to FIG. 5, and may be a harmonic generated when the initial angle of the first drive motor does not need to be corrected.

According to a calculation step 415, the controller 135 or 225 may calculate an average value of the sixth harmonic and an average value of the reference sixth harmonic.

According to a calculation step 420, the controller 135 or 225 may calculate an average difference value between the average value of the sixth harmonic and the average value of the reference sixth harmonic.

According to a selection step 425, the controller 135 or 225 may select an angle correction value based on a table (e.g., a memory) according to the average difference value.

According to a calculation step 430, the controller 135 or 225 may calculate the initial angle of the first drive motor based on the minimum value of the angle difference value and the angle correction value.

The calculation step 415, the calculation step 420, the selection step 425, and the calculation step 430 will be described with reference to FIGS. 9, 10 and 11 as follows.

For example, when the peak value of the sixth harmonic is generated six times during one cycle of the electric angle of the drive motor as shown in FIG. 9, it may not be determined which a peak value difference (e.g., $\theta c1$ or $\theta c2$) is used in order to correct the initial angle of the drive motor. In order to solve this problem, an average value $V_{d\_}avg2$ of the sixth harmonic and an average value $V_{d\_}avg1$ of the reference sixth harmonic shown in FIG. 10 may be calculated. This may be because the initial angle of the drive motor varies depending on a magnitude of $V_d$ or $V_q$.

After an average difference value ($V_{d\_}diff = V_{d\_}avg2 - V_{d\_}avg1$) between the average value ($V_{d\_}avg2$) of the sixth harmonic and the average value ($V_{d\_}avg1$) of the reference sixth harmonic is calculated, the controller 135 or 225 may select a correction factor ($\alpha$) based on the table according to the average difference value and may select the angle correction value ($\alpha \times 60$ degree). In FIG. 11, K1, K2, K3, K4, and K5 may be changed according to a characteristic of the drive motor and may be determined by a test.

The controller 135 or 225 may calculate the initial angle $\theta c$ of the first drive motor 110 or 210 according to the following equation based on the minimum value ($\theta cm$) of the angle difference value and the angle correction value ($\alpha \times 60$ degree).

$$\theta c = \theta cm + (\alpha \times 60 \text{ degree})$$

In the above equation, the correction factor $\alpha$ may have a value of 0, 1, 2, 3, 4, or 5.

According to a calculation step 320, the controller 135 or 225 may calculate an angle of the first drive motor 110 or 210 by adding angle information of the second drive motor 120 or 220 provided by the angle sensor 122 or 222 of the second drive motor to the initial angle $\theta c$ of the first drive motor 110 or 210.

According to a control step 325, the controller 135 or 225 may control an operation of the first drive motor 110 or 210 based on the angle of the first drive motor. In more detail, since the first drive motor and the second drive motor are mechanically connected to each other by the clutch engagement in the HEV mode, the angle information of the second drive motor may be used as the angle information of the first drive motor. The controller 135 or 225 may control an operation of the second drive motor 120 or 220 based on the angle information of the second drive motor.

According to a setting step 330, the controller 135 or 225 may set an initial angle of the first drive motor 110 or 210 when the operation mode of the hybrid vehicle is the battery charge mode or the engine start mode. An operation of the setting step 330 may be similar to an operation of the setting step 315.

According to a calculation step 335, the controller 135 or 225 may calculate an angle of the first drive motor 110 or 210 by adding angle information of the engine 105 or 230 calculated based on engine speed information provided by the engine speed sensor 106 or 232 of the engine to the initial angle $\theta c$ of the first drive motor 110 or 210. The controller 135 or 225 may calculate the angle information d (Erpm)/dt of the engine by differentiating the engine speed information Erpm with respect to time.

According to a control step 340, the controller 135 or 225 may control an operation of the first drive motor 110 or 210 based on the engine speed information. In more detail, since the engine 105 or 230 and the first drive motor 110 or 210 are mechanically coupled in the engine start mode or the battery charge mode, the angle information of the engine may be used as the angle information of the first drive motor 110 or 210.

As described above, the exemplary embodiment of the present disclosure may estimate a rotation angle of the first drive motor using the engine speed sensor and the angle sensor of the second drive motor without including an angle sensor in the first drive motor. The initial value of the rotation angle of the first drive motor may be selected based on the $V_d$ value or the $V_q$ value used for the motor control when the rotation angle of the motor is estimated.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A method for controlling a hybrid vehicle, comprising:
    determining, by a controller, an operation mode of the hybrid vehicle based on operation state information of the hybrid vehicle; and
    controlling, by the controller, a first drive motor included in the hybrid vehicle based on angle information of a second drive motor of the hybrid vehicle provided by an angle sensor of the second drive motor when the operation mode of the hybrid vehicle is a hybrid electric vehicle mode,
    wherein the hybrid electric vehicle mode is an operation mode in which an engine of the hybrid vehicle, the first drive motor, and the second drive motor drive the hybrid vehicle.

2. The method of claim 1, wherein controlling the first drive motor further comprises:
    setting, by the controller, an initial angle of the first drive motor;
    calculating, by the controller, an angle of the first drive motor based on the initial angle of the first drive motor and the angle information of the second drive motor; and
    controlling, by the controller, the first drive motor based on the angle of the first drive motor.

3. The method of claim 2, wherein setting the initial angle of the first drive motor further comprises:
    calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage;
    calculating, by the controller, an average value of the sixth harmonic and an average value of the reference sixth harmonic;
    calculating, by the controller, an average difference value between the average value of the sixth harmonic and the average value of the reference sixth harmonic;
    selecting, by the controller, an angle correction value based on a table according to the average difference value; and
    calculating, by the controller, the initial angle of the first drive motor based on the minimum value of the angle difference value and the angle correction value,
    wherein the reference sixth harmonic is a harmonic generated when the initial angle of the first drive motor does not need to be corrected.

4. The method of claim 1, further comprising:
    controlling, by the controller, the second drive motor based on the angle information of the second drive motor when the operation mode of the hybrid vehicle is an electric vehicle mode,
    wherein the electric vehicle mode is an operation mode in which the second drive motor drives the hybrid vehicle.

5. The method of claim 1, further comprising:
    controlling, by the controller, the first drive motor based on engine speed information provided by an engine speed sensor of the engine when the operation mode of the hybrid vehicle is an engine start mode,
    wherein the engine start mode is an operation mode in which the first drive motor starts the engine.

6. The method of claim 5, wherein controlling the first drive motor further comprises:
    setting, by the controller, an initial angle of the first drive motor;
    calculating, by the controller, an angle of the first drive motor based on angle information of the engine calculated based on the initial angle of the first drive motor and the engine speed information; and
    controlling, by the controller, the first drive motor based on the angle of the first drive motor.

7. The method of claim 6, wherein setting the initial angle of the first drive motor further comprises:
    calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage;
    calculating, by the controller, an average value of the sixth harmonic and an average value of the reference sixth harmonic;
    calculating, by the controller, an average difference value between the average value of the sixth harmonic and the average value of the reference sixth harmonic;
    selecting, by the controller, an angle correction value based on a table according to the average difference value; and
    calculating, by the controller, the initial angle of the first drive motor based on the minimum value of the angle difference value and the angle correction value,
    wherein the reference sixth harmonic is a harmonic generated when the initial angle of the first drive motor does not need to be corrected.

8. The method of claim 1, further comprising:
    controlling, by the controller, the first drive motor based on engine speed information provided by an engine speed sensor of the engine when the operation mode of the hybrid vehicle is a battery charge mode,
    wherein the battery charge mode is an operation mode in which the first drive motor charges a battery of the hybrid vehicle.

9. The method of claim 8, wherein controlling the first drive motor further comprises:
- setting, by the controller, an initial angle of the first drive motor;
- calculating, by the controller, an angle of the first drive motor based on angle information of the engine calculated based on the initial angle of the first drive motor and the engine speed information; and
- controlling, by the controller, the first drive motor based on the angle of the first drive motor.

10. The method of claim 9, wherein setting the initial angle of the first drive motor further comprises:
- calculating, by the controller, a minimum value of an angle difference value between an electric angle of the first drive motor corresponding to a peak value of a sixth harmonic of a D-axis voltage or a Q-axis voltage for controlling the first drive motor and an electric angle of the first drive motor corresponding to a peak value of a reference sixth harmonic of the D-axis voltage or the Q-axis voltage;
- calculating, by the controller, an average value of the sixth harmonic and an average value of the reference sixth harmonic;
- calculating, by the controller, an average difference value between the average value of the sixth harmonic and the average value of the reference sixth harmonic;
- selecting, by the controller, an angle correction value based on a table according to the average difference value; and
- calculating, by the controller, the initial angle of the first drive motor based on the minimum value of the angle difference value and the angle correction value,
- wherein the reference sixth harmonic is a harmonic generated when the initial angle of the first drive motor does not need to be corrected.

11. The method of claim 1, wherein a clutch connecting the first drive motor with the second drive motor or disconnecting the first drive motor from the second drive motor is disposed between the first drive motor and the second drive motor.

12. The method of claim 1, wherein a planetary gear set transmitting power of the first drive motor, power of the engine, and power of the second drive motor drives the hybrid vehicle.

* * * * *